E. W. HURLBUTT.
GATE.
APPLICATION FILED JULY 6, 1912.
1,060,549.
Patented Apr. 29, 1913.
2 SHEETS—SHEET 1.
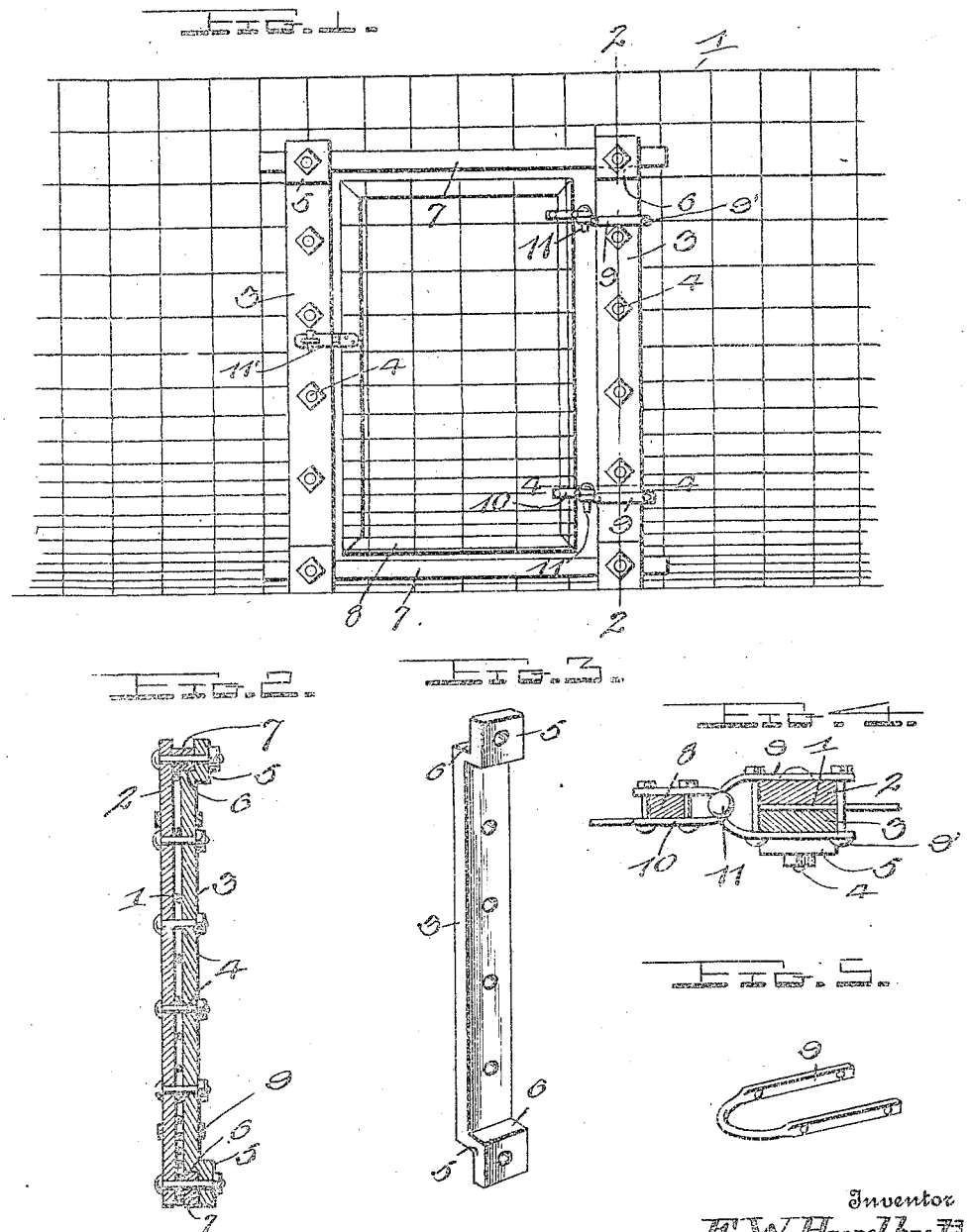
Witnesses
Chas. L. Griestner
A. B. Norton
Inventor
E. W. Hurlbutt
By Watson E. Coleman
Attorney E. W. HURLBUTT.
GATE.
APPLICATION FILED JULY 6, 1912.
1,060,549.
Patented Apr. 29, 1913
2 SHEETS—SHEET 2.
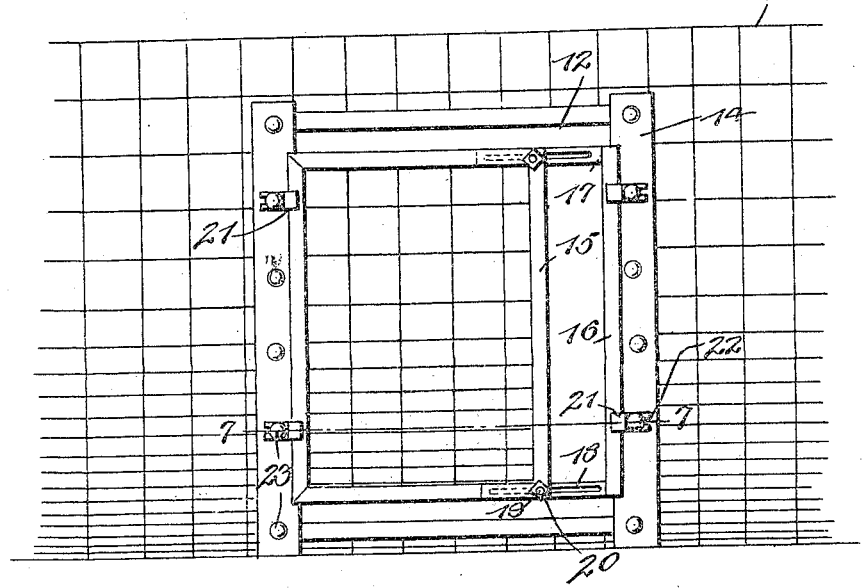
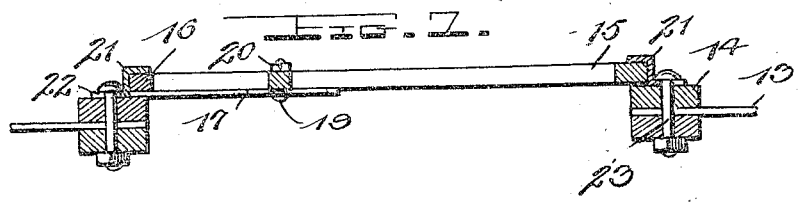
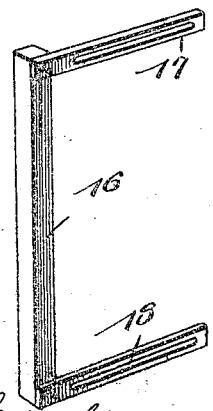
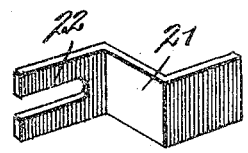
Witnesses
Chas L. Griesbauer
A. B. Norton.
Inventor
E. W. Hurlbutt
By Watson E. Coleman
Attorney

UNITED STATES PATENT OFFICE.

EARL W. HURLBUTT, OF VAN WERT, OHIO.

GATE.

1,060,549.   Specification of Letters Patent.   Patented Apr. 29, 1913.

Application filed July 6, 1912. Serial No. 708,046.

*To all whom it may concern:*

Be it known that I, EARL W. HURLBUTT, a citizen of the United States, residing at Van Wert, in the county of Van Wert and State of Ohio, have invented certain new and useful Improvements in Gates, of which the following is a specification, reference being had to the accompanying drawings.

My invention relates to new and useful improvements in farm and stock gates and more particularly to a gate adapted to be formed within a line of wire fencing and my object is to provide a device of this character which is extremely simple and durable in construction, inexpensive to manufacture and one which will be very efficient and useful in operation.

A further object of the invention resides in providing a gate of this character which will not affect the strength of the line of fencing and a still further object resides in providing a gate which will permit stock of various sizes to pass through the gate-way.

With these and other objects in view, the invention consists in the novel features of construction, combination and arrangement of parts as will be hereinafter referred to and more particularly pointed out in the specification and claims.

In the accompanying drawings forming a part of this application, Figure 1 is a front elevation of a line of fencing showing my improved gate formed therein. Fig. 2 is a section therein, as seen on line 2—2, Fig. 1. Fig. 3 is a perspective view of one of the bars forming the gate-way. Fig. 4 is a horizontal section as seen on line 4—4, Fig. 1. Fig. 5 is a perspective view of one of the hinge members for the gate. Fig. 6 is a rear elevation showing a slightly modified form of the invention. Fig. 7 is a horizontal section therethrough as seen on line 7—7, Fig. 6. Fig. 8 is a perspective view of an adjustable extension formed on the gate; and Fig. 9 is a similar view of one of the guide members of the gate.

In describing my invention, I shall refer to the drawings in which similar reference characters designate corresponding parts throughout the several views and in which—

1 indicates a line of fencing formed of vertical and horizontal wires to the one side of which are applied a pair of flat bars 2, spaced from one another, as desired, and to the other side of which are applied in alinement with the aforesaid bars, a pair of additional bars 3. The bars 3, applied over or in alinement with the bars 2, are secured to the latter by means of the bolts 4, and the ends of said bars 3 are offset as shown at 5, to provide shoulders 6 thereon. These shoulders 6 on the inner faces of the bars 3 are adapted to receive thereagainst the upper and lower horizontal bars 7 which are secured in position by certain of the bolts 4 and when this rectangular frame has been properly formed by the vertical bars 2 and 3, and the horizontal bars 7, the inclosed wires of the fence 1 are cut therefrom to form a gate-way. A rectangular gate frame 8 is also provided which is adapted to be covered by the vertical and horizontal wires removed from that portion of the fence 1 inclosed by the first mentioned frame and in order to hingedly mount this gate on the frame, the U-shaped clips or hinging members 9 are mounted on the one set of vertical bars of the gate frame to project within the gate-way. These U-shaped clips or hinging members 9 are adjustably clamped on the one set of bars by means of the bolts 9' and similarly mounted on the adjacent side bar of the gate frame 8, are the additional clips or hinging members 10. When the projecting portions of these members 9 and 10 are disposed over one another, pintles or the like 11 may be inserted therein, whereby the gate may be hingedly held to the frame and it will be appreciated that through the medium of the adjustment of these members 9 and 10, the hinging members may be disposed in any desired position. In order to retain the gate in its closed position, any desired locking means 11' may be provided.

In Figs. 6 to 9 inclusive, I have shown a slightly modified form of the invention, wherein a gate-way 12 is formed in a line of fencing 13 by providing a frame 14 composed of the vertical and horizontal bars similar to the bars 2, 3 and 7 and removing the inclosed fence wires therefrom. The frame of the gate 15 is then covered with the removed wires, as in the other instance, but in this form, the gate-way is formed preferably of a greater width than the gate proper, and to compensate therefor, I provide an extension member 16 for the gate. This extension member is of substantial U shape, the parallel arms 17 of which are provided with the slots 18 and in order to adjustably mount this member on the gate 15, the bolts 19 are extended through said slots and through the upper and lower horizontal bars of the gate 15, the free ends of said bolts being engaged with nuts 20. From this construction, it is obvious that the extension 16 may be adjusted on the gate frame, as desired, so as to fit any size gateway.

I have provided for slidably mounting this gate with its extension thereon in the gate-way and to this end, I provide the angular guide keepers or the like 21, one arm of each of which is bifurcated as shown at 22 so as to be readily engaged under the heads of the bolts 23 which secure the pairs of vertical bars together forming the frame 14. These keepers or the like 21 being angular or offset, have portions thereof spaced from the outer faces of the flat bars of said frame 14 and the gate 15, with its extension 16 thereon, is slidably disposed between these keepers and the outer faces of the adjacent bars on said frame 14.

From this construction it will be seen that smaller animals may readily pass through the opening between the outer free end of the gate 15 and the base portion of the U-shaped extension 16, while large animals will be prevented from passing and can only pass through said gate-way by completely raising the gate. It will further be seen that by adjustably mounting this extension 16 on the gate, the same may be operated to be mounted in gate-ways of various sizes and will also permit animals of certain sizes to pass therethrough, while animals of other sizes may be excluded.

From the foregoing description of the construction of my improved gate, the operation thereof will be readily understood and it will be seen that I have provided a gate adapted to be formed within a line of fencing, which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. The combination with a line of fencing having an opening therein; of a frame surrounding the opening comprising flat vertical bars disposed on one side of said fencing, additional vertical bars mounted on the opposite side of the fencing, in alinement with the aforesaid bars, said latter bars being provided with offset ends, upper and lower horizontal bars mounted in the offset ends of said last mentioned bars, means to secure said vertical and horizontal bars together, and a gate carried by the aforesaid frame and designed to cover the opening in the line of fencing.

2. The combination with a line of fencing having an opening therein; of a frame surrounding the opening, a gate for the opening, of less width than the latter, an adjustable extension for the gate, and means to retain the gate and extension thereon in vertically slidable position in connection with said frame.

3. The combination with a line of fencing having an opening therein; of a frame surrounding the opening, a gate for the opening of less width than the latter, an extension frame for the gate adjustably connected to the one end thereof, said gate with the extension thereon being adapted to rest flatly against the side bars of the frame surrounding said opening, and a plurality of angular keepers adjustably secured to the last mentioned frame and projected over said gate and extension frame thereof to retain the same in vertically slidable position over the opening.

In testimony whereof I hereunto affix my signature in the presence of two witnesses.

EARL W. HURLBUTT.

Witnesses:
CLEM V. HOKE,
W. H. DAILEY.